(12) United States Patent
Ichinose et al.

(10) Patent No.: US 7,952,214 B2
(45) Date of Patent: May 31, 2011

(54) WIND POWER GENERATION SYSTEM AND METHOD OF CONTROLLING POWER CONVERTER

(75) Inventors: Masaya Ichinose, Hitachiota (JP); Shinya Oohara, Hitachi (JP); Motoo Futami, Hitachiota (JP); Mitsugu Matsutake, Hitachi (JP); Hiromitsu Sakai, Tokai (JP)

(73) Assignee: Hitachi, Ltd., Tokyo (JP)

( * ) Notice: Subject to any disclaimer, the term of this patent is extended or adjusted under 35 U.S.C. 154(b) by 558 days.

(21) Appl. No.: 12/128,121

(22) Filed: May 28, 2008

(65) Prior Publication Data

US 2008/0296898 A1 Dec. 4, 2008

(30) Foreign Application Priority Data

May 30, 2007 (JP) .................. 2007-142751

(51) Int. Cl.
*H02P 9/00* (2006.01)
*F03D 9/00* (2006.01)
(52) U.S. Cl. ................. 290/44; 290/55; 322/24
(58) Field of Classification Search ............ 290/43, 290/44, 54, 55; 322/24, 28, 37
See application file for complete search history.

(56) References Cited

U.S. PATENT DOCUMENTS

| | | | | |
|---|---|---|---|---|
| 7,268,443 B2 * | 9/2007 | Kikuchi et al. | .................. | 290/44 |
| 7,615,880 B2 * | 11/2009 | Kikuchi et al. | .................. | 290/44 |
| 7,692,323 B2 * | 4/2010 | Ichinose et al. | .................. | 290/44 |
| 7,692,325 B2 * | 4/2010 | Ichinose et al. | .................. | 290/44 |
| 7,728,451 B2 * | 6/2010 | Ichinose et al. | .................. | 290/44 |
| 7,847,427 B2 * | 12/2010 | Ichinose et al. | .................. | 290/44 |

FOREIGN PATENT DOCUMENTS

| | | |
|---|---|---|
| CN | 1748356 | 3/2006 |
| JP | 09-028032 | 1/1997 |
| JP | 10-191697 | 7/1998 |
| JP | 11-18486 | 1/1999 |
| JP | 11-206196 | 7/1999 |
| JP | 2004-153941 | 5/2004 |
| JP | 2006-230085 | 8/2006 |
| JP | 2007-244136 | 9/2007 |

OTHER PUBLICATIONS

U.S. Appl. No. 11/769,753, filed Jun. 28, 2007, Masaya Ichinose et al.
U.S. Appl. No. 11/751,742, filed May 22, 2007, Masaya Ichinose et al.
U.S. Appl. No. 11/954,453, filed Dec. 12, 2007, Masaya Ichinose et al.
U.S. Appl. No. 12/116,272, filed May 7, 2008, Masaya Ichinose et al.

* cited by examiner

*Primary Examiner* — Nicholas Ponomarenko
(74) *Attorney, Agent, or Firm* — Antonelli, Terry, Stout & Kraus, LLP.

(57) ABSTRACT

A wind power generation system temporarily stops a power converter when a system disturbance occurs, and reactivates the power converter after detecting a solution of the problem of an influence (overcurrent of a stator, direct current component of a stator, overcurrent of a rotor, etc.) of a fault occurring in a doubly-fed generator during a system fault. During a system fault, a reactive current can be safely output from a doubly-fed generator to an electric power system without destroying equipment of the wind power generation system.

18 Claims, 13 Drawing Sheets

WIND POWER GENERATION SYSTEM AND METHOD OF CONTROLLING POWER CONVERTER

CROSS-REFERENCE TO RELATED APPLICATION

The present application relates to subject matters described in a co-pending patent application Ser. No. 11/769,753 filed on Jun. 28, 2007 entitled "VARIABLE SPEED WIND POWER GENERATION SYSTEM", Ser. No. 11/751,742 filed on May 22, 2007 entitled "WIND POWER GENERATION APPARATUS, WIND POWER GENERATION SYSTEM AND POWER SYSTEM CONTROL APPARATUS", Ser. No. 11/954,453 filed on Dec. 12, 2007 entitled "WIND POWER GENERATION SYSTEM", and Ser. No. 12/116,272 filed on May 7, 2008 entitled "WIND POWER GENERATION SYSTEM AND OPERATING METHOD THEREOF" every which by Masaya Ichinose, et al. and assigned to the assignees of the present application. The disclosures of these co-pending applications are incorporated herein by reference.

BACKGROUND OF THE INVENTION

The present invention relates to a power generation system for providing power to an electric power system, and more specifically to a wind power generation system.

The doubly-fed generator (wound-rotor induction generator) used for a power generation system can output an AC voltage of the same frequency as the system frequency on the stator side by the power converter exciting the rotor coil at a slip frequency, thereby variably controlling the number of rotations. Furthermore, the power generation system using a doubly-fed generator can require reduced capacity of power converter as compared with the capacity of a generator.

However, when a voltage drops due to a ground fault in an electric power system, the doubly-fed generator operates to supply a current to a faulty point. At this time, an overcurrent is induced in the secondary coil, and an overcurrent passes through an exciting power converter connected to the secondary side. Therefore, to stand the overcurrent, the element capacity of the power converter is increased to the rating equal to or more than that of the generator, or an alternating current reactor for short-circuiting the secondary coil, etc.

Conventionally, a doubly-fed generator is mainly provided for a large wind power generation system and a power converter is temporarily stopped in a long power failure in a system, and is activated again after the system voltage is recovered to the normal condition. For example, the JP-A-11-18486 discloses an example of a power conversion device for a conventional doubly-fed generation system.

SUMMARY OF THE INVENTION

A standard of supplying a reactive current during a system fault without disconnecting a wind power generation system from the electric power system is defined in Europe etc., and a system operator requests the technology of controlling the reactive current while a system voltage drops, and supplying the controlled current to the electric power system. Thus, by controlling a reactive current while a system voltage is dropping and supplying the current to the electric power system, the power of the electric power system can be stabilized.

In the conventional wind power generation system using a doubly-fed generator, when a fault occurs with voltage dropping in an electric power system, a power converter is stopped, and after the voltage of the electric power system is recovered, the power converter is reactivated. In the control method, there has been the problem that a reactive current cannot be supplied to an electric power system while the system is faulty.

The present invention aims at providing a wind power generation system capable of supplying a reactive current to an electric power system while the system is faulty.

One of the characteristics of the present invention is that the wind power generation system having a doubly-fed generator detects a decrease of a stator current while the system is faulty, then reactivates a power converter, and can output a reactive current from a generator to an electric power system.

The present invention can provide a wind power generation system capable of supplying a reactive current to an electric power system while the system is faulty.

Other objects, features and advantages of the invention will become apparent from the following description of the embodiments of the invention taken in conjunction with the accompanying drawings.

DESCRIPTION OF THE EMBODIMENTS

The operation of protecting a power converter for exciting in a doubly-fed generator, and realizing further continuing the operation is performed by resuming the operation after removing the influence of a system fault of a generator. In addition, when a system voltage falls below a predetermined value, the detected phase of a phase detector is calculated from the frequency before the drop of the voltage.

Embodiment 1

Figure 1:
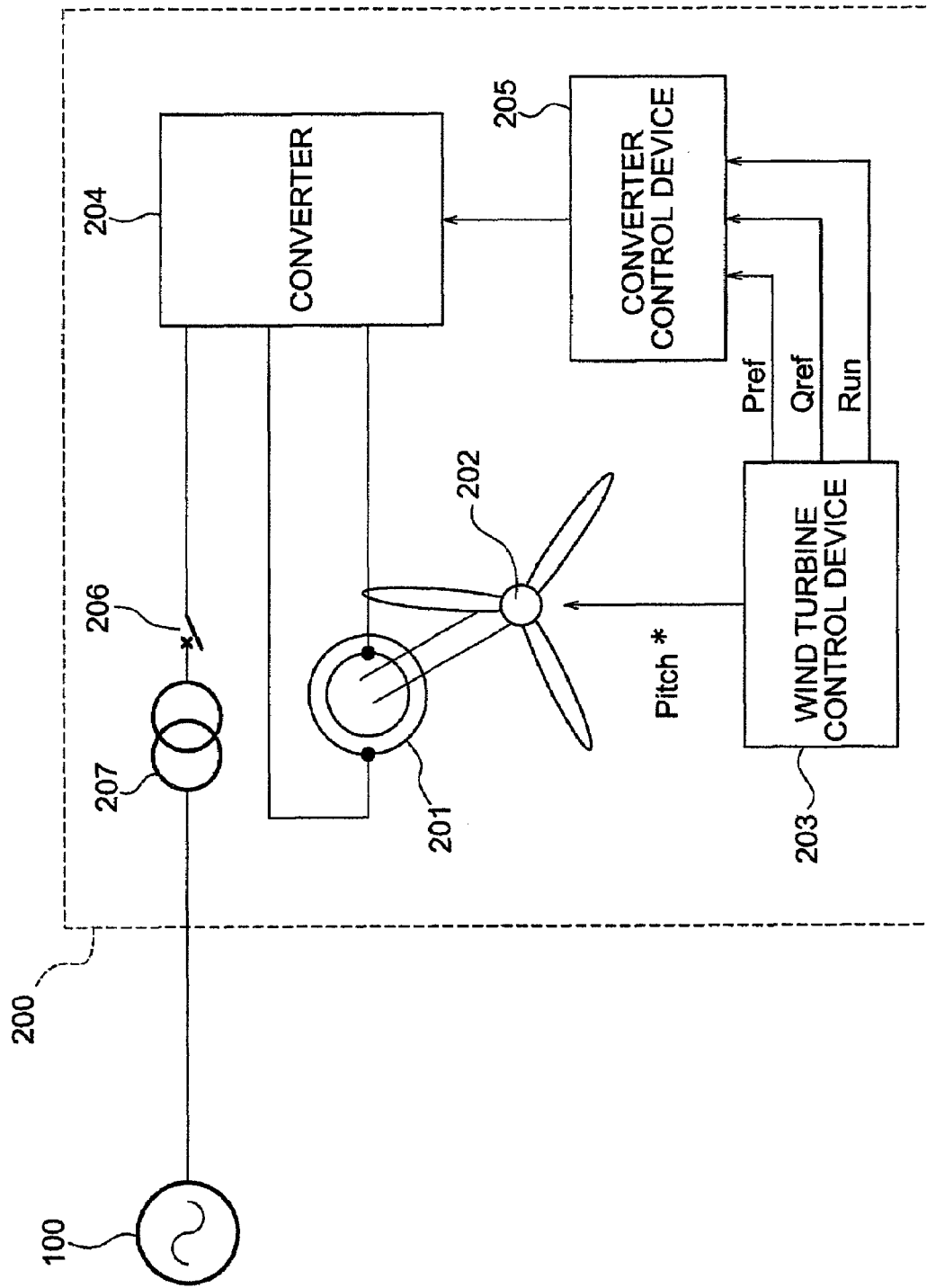
FIG. 1 is an explanatory view of a circuit configuration of the electric power system and a wind power generation device according to an embodiment of the present invention.
Figure 2:
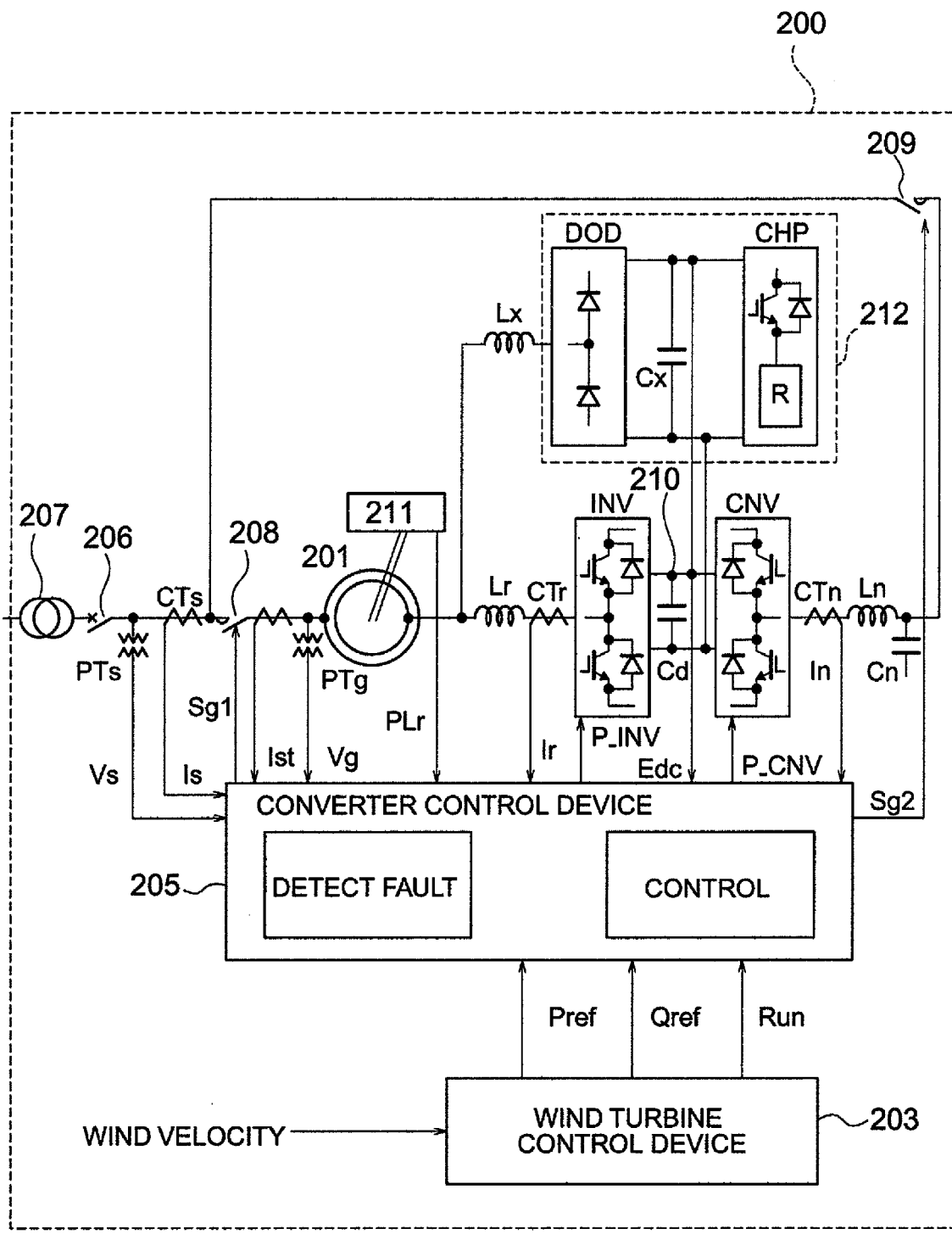
FIG. 2 is an explanatory view of the configuration of the wind power generation device.

The device configuration (single-line diagram) of the first embodiment of the present invention is described below with reference to FIGS. 1 and 2. A wind power generation system 200 is connected to an electric power system 100 through a transmission line.

The wind power generation system 200 is mainly configured by a generator 201, a wind turbine 202, a wind turbine control device 203, a converter (excitation device) 204, and a converter control device 205.

The wind turbine 202 is mechanically connected to a rotor of the generator 201 (through a gear etc.). The rotor coil of the generator 201 is electrically connected to the converter 204, and the stator of the generator 201 is electrically connected to the electric power system through the breaker 206 and the transformer 207 etc.

The wind turbine control device 203 detects a wind velocity, controls the pitch angle of the wind turbine 202, calculates an active power command value, outputs an active power command value Pref, outputs a drive/stop command value Run, transmits a reactive power command value Qref, etc.

Each of the reactive power command value Qref, the active power command value Pref, and the drive/stop command value Run is transmitted to the converter control device 205.

The converter control device 205 controls the converter 204 at a command value, and controls the power (active power, reactive power) between the generator 201 and the power system. It also has the function of detecting a fault of a drop of a system voltage, an overcurrent of the direct current and the alternating current of the current of the generator stator, etc., and has the function of changing the operation mode for converter control when a fault is detected.

Next, the wind power generation system 200 is described below in detail with reference to FIGS. 2 to 5. The three-phase output of the stator side of the generator 201 is connected to the secondary side of, for example, an electromagnetic contactor 208 that can be opened and closed by an external signal Sg1. The primary side of the electromagnetic contactor 208 is connected to the primary side of a second electromagnetic contactor 209. The secondary side of the electromagnetic contactor 209 is connected to the converter CNV through the AC filter circuit configured by a capacitor Cn and a reactor Ln.

A DC circuit 210 of the converter CNV is connected to the DC circuit 210 of the converter INV, and the alternating current output of the converter INV is electrically connected to the rotor coil of the generator 201 through the reactor Lr etc. The primary side of the electromagnetic contactor 208 is connected to the electric power system through the breaker 206 and the transformer 207.

Concurrent with the converter INV for excitation, a rectifier 212 is connected through the reactor Lx. The rectifier 212 is configured by a rectifier DOD and an energy consuming device CHP. The rectifier DOD is connected to the secondary side coil terminal of the generator Gen. The rectifier DOD has a capacitor Cx for the direct current. The rectifier DOD is connected to the DC circuit 210 of the power converter, and also connected to the energy consuming device CHP configured by a semiconductor switch and a resistor R.

The breaker 206 has the function of opening a breaker to cut off the current when an overcurrent continues to protect the wind power generation system 200, and the function of completely stopping the wind power generation system 200 to electrically disconnect it from the system.

The converter INV on the generator side and the converter CNV on the system side are configured using, for example, a semiconductor switching element (thyristor, GTO, IGBT, MOS, SiC, etc.), and has the function of converting an alternating current into a direct current or direct current into an alternating current.

The alternating current output terminal of the converter CNV on the system side is provided with an AC filter configured by a reactor Ln and a capacitor Cn for attenuating the harmonic current and a harmonic voltage.

A blade for generating wind power is connected to the rotor of the generator 201 through a gear etc., and is rotated by the force of the wind. A position detector 211 of an encoder etc. for detecting the rotation position is connected to the rotor, and a phase signal PLr is output.

Next, the wiring and device for controlling the generated power is described below. The three-phase voltage and the three-phase current on the secondary side of the breaker 206 are converted into a system voltage detection value Vs of a low voltage and a current detection signal Is of a system voltage respectively by the voltage sensor PTs and the current sensor CTs, and the system voltage detection values Vs and Is of the low voltage are input to the converter control device 205.

The voltage of the secondary side of the electromagnetic contactor 208 (between the electromagnetic contactor 208 and the stator of the generator 201) is converted into a signal Vg of a low voltage by the voltage sensor PTg, and input to the converter control device 205.

The voltage of the capacitor Cd connected to the DC circuits 210 of the converters INV and CNV is converted into the DC voltage signal Edc of a low voltage by a voltage sensor, and the DC voltage signal Edc is input to the converter control device 205.

The output current Ir of the converter INV is detected by the current sensor CTr, and the output current In of the converter CNV is detected by the current sensor CTn, and the current detection values Ir and In are transmitted to the converter control device 205.

In addition, the wind turbine control device 203 has communication functions of transmitting a drive/stop command value Run, an active power command value Pref, a reactive power command value Qref, etc. to the converter control device 205, communicating with an external unit by detecting the amount of state of a wind turbine and a system, etc.

The converter control device 205 controls the electromagnetic contactors 208 and 209 according to the signals Sg1 and Sg2 respectively, and outputs pulse signals P_INV and P_CNV for respectively drive-controlling the converters INV and CNV configured by semiconductor switching elements. The converter control device 205 controls the rectifier 212 by a signal P_CHP.

Figure 3:
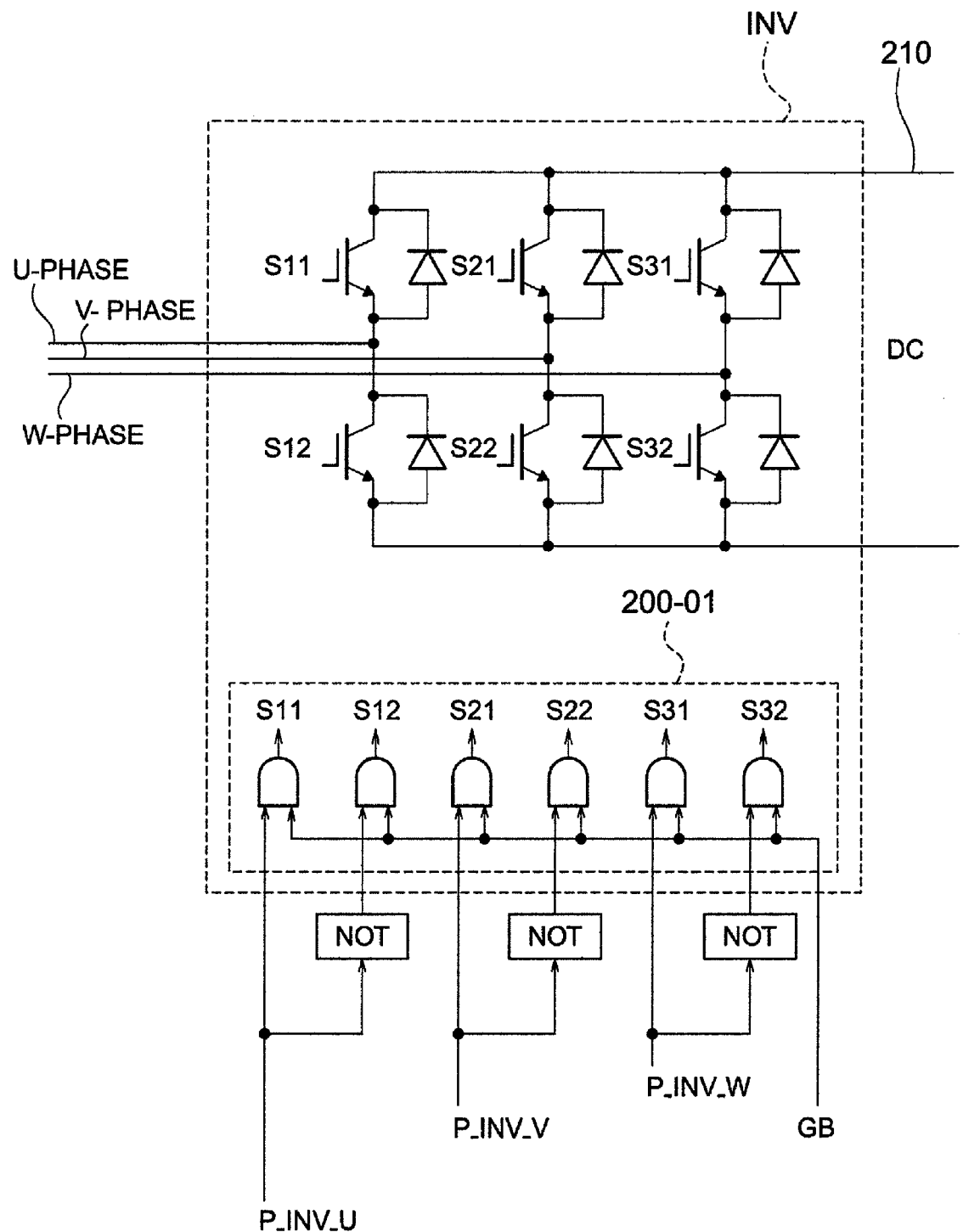
FIG. 3 is an explanatory view of a converter INV.

FIG. 3 shows the configuration of the converter INV. The converter INV is configured by a semiconductor element etc. FIG. 3 shows the configuration of the three-phase converter configured by semiconductor elements (IGBT) S11, S12, S21, S22, S31, and S32. The elements S11 and S12 configure U-phase upper and lower arms. The elements S21 and S22 configure V-phase upper and lower arms. The elements S31 and S32 configure W-phase upper and lower arms.

By turning on and off the semiconductor elements, a three-phase AC voltage is generated on the AC terminal, and the output current Ir can be controlled by adjusting the AC voltage.

The gate signal P_INV for turning on/off a semiconductor element is provided by the converter control device 205. The subscript U of the gate signal P_INV indicates a U-phase signal P_INV_U. gate signal P_INV_V is a V-phase, and a gate signal P_INV_W is a W-phase.

The gate signal of the U-phase lower arm element S12 is provided with an inverted upper arm element S11 (that is, when S11 is ON, the element S12 is OFF). Similarly, relating to the upper and lower arms of the V-phase and W-phase, the lower arm is provided with an inverse signal of the upper arm. To generate an inverse signal, an inverter NOT is used. The period from the gate signals S11 to S32 is the short-circuit preventive period of the upper and lower arms. Therefore, a dead-time period is added in the gate circuit, but it is omitted in this example.

A gate block signal GB is used to stop turning on/off of the semiconductor elements. The gate block signal GB is input to the AND circuit with the pulse signal P_INV, and GB="0" when the gate is stopped. Therefore, the semiconductor elements S11 to S32 are all OFF regardless of the pulse signal P_INV.

Figure 4:
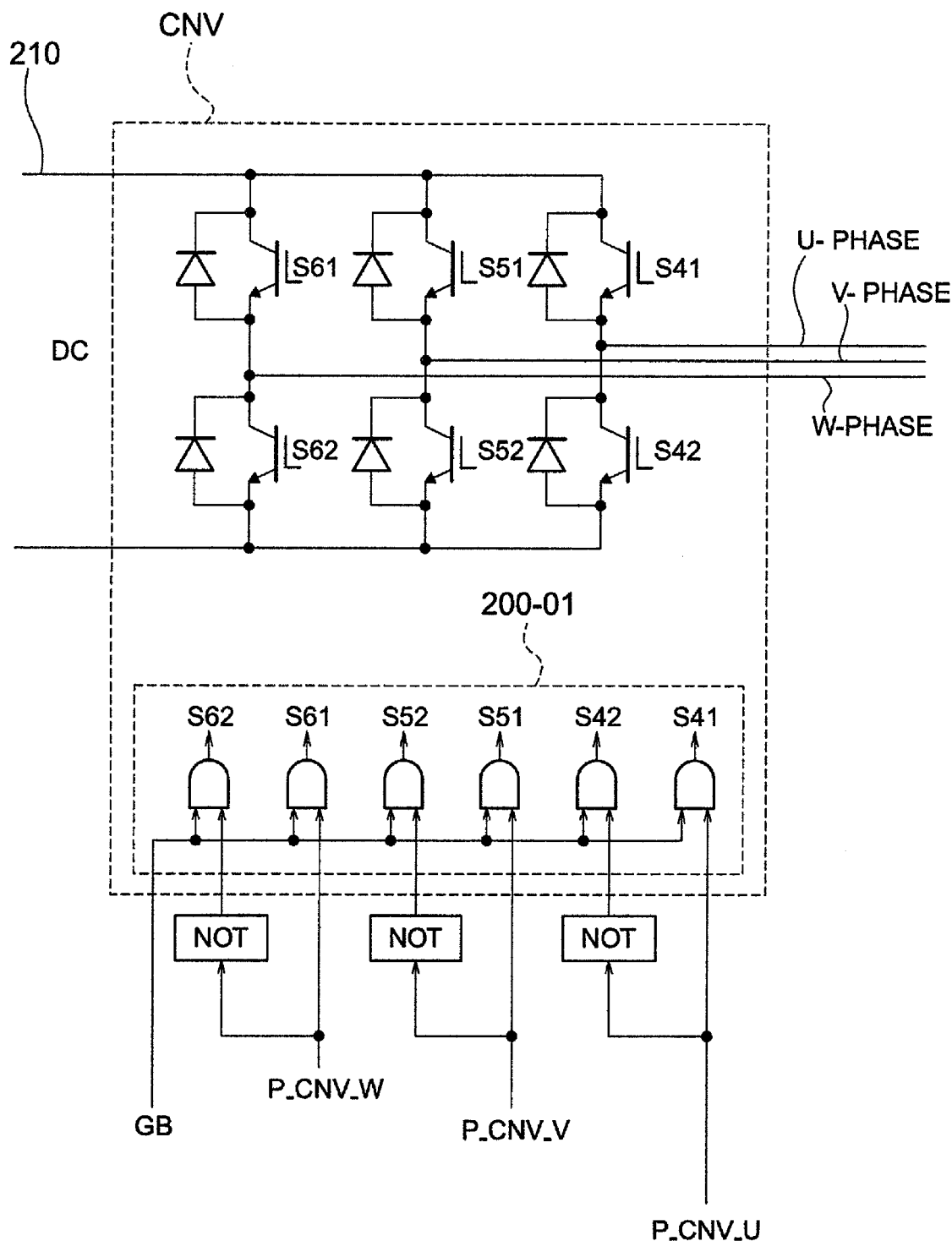
FIG. 4 is an explanatory view of a converter CNV.

FIG. 4 shows the configuration of the converter CNV. The converter CNV is configured by a semiconductor element etc. FIG. 3 shows the configuration of the three-phase converter configured by semiconductor elements (IGBT) S41, S42, S51, S52, S61, and S62. The elements S41 and S42 configure U-phase upper and lower arms. The elements S51 and S52 configure V-phase upper and lower arms. The elements S61 and S62 configure W-phase upper and lower arms.

By turning on and off the semiconductor elements, a three-phase AC voltage is generated on the AC terminal, and the output current In can be controlled by adjusting the AC voltage.

The gate signal P_CNV for turning on/off a semiconductor element is provided by the converter control device 205. The subscript U of the gate signal P_CNV indicates a U-phase signal P_CNV_U. gate signal P_CNV_V is a V-phase, and a gate signal P_CNV_W is a W-phase.

The gate signal of the U-phase lower arm element S42 is provided with an inverted upper arm element S41 (that is, when S41 is ON, the element S42 is OFF). Similarly, relating to the upper and lower arms of the V-phase and W-phase, the lower arm is provided with an inverse signal of the upper arm. To generate an inverse signal, an inverter NOT is used. The period from the gate signals S41 to S62 is the short-circuit preventive period of the upper and lower arms. Therefore, a dead-time period is added in the gate circuit, but it is omitted in this example.

A gate block signal GB is used to stop turning on/off of the semiconductor elements. The gate block signal GB is input to the AND circuit with the pulse signal P_CNV, and GB="0" when the gate is stopped. Therefore, the semiconductor elements S41 to S62 are all OFF regardless of the pulse signal P_CNV.

Figure 5:
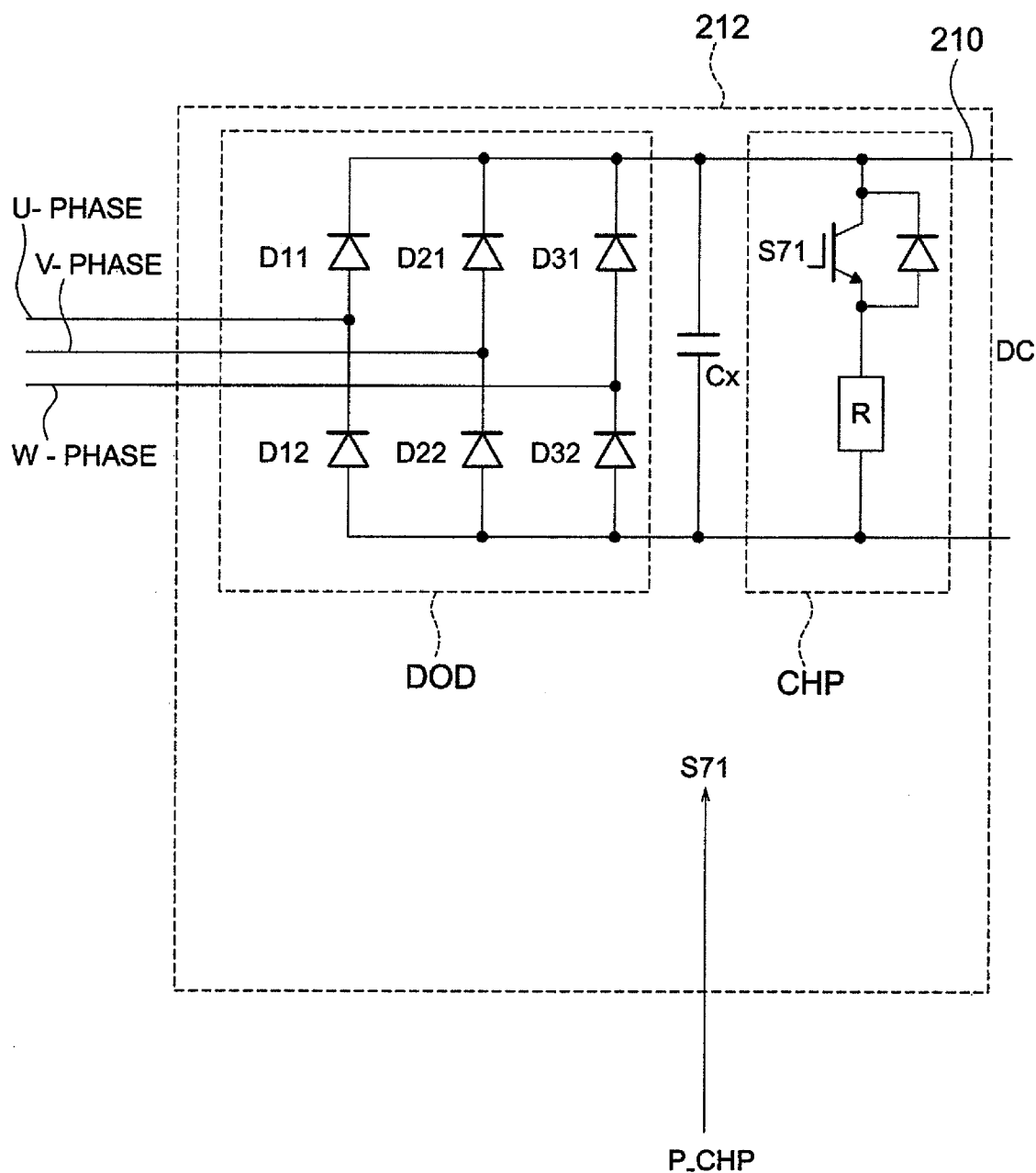
FIG. 5 shows the configuration of a rectifier 212.

FIG. 5 shows the configuration of the rectifier 212. The rectifier DOD is configured by a semiconductor element etc. In this example, the rectifier DOD is configured by diodes D11, D12, D21, D22, D31, and D32. The direct current of the diode rectifier is connected to the capacitor Cx, and to the energy consuming device CHP. In the energy consuming device CHP, the semiconductor element (IGBT) S71 is connected to the resistor R in a series, and they are connected to the direct current of the rectifier DOD.

By turning on the semiconductor element S71, the energy input from the three-phase alternating current to the direct current is consumed to prevent the overvoltage of the direct current. The function of preventing the overvoltage operates when an overcurrent occurring in the rotor of a generator due to the voltage drop of a system is to be absorbed.

The signal P_CHP for turning on/off the semiconductor element S71 is provided from the converter control device 205.

Figure 6:
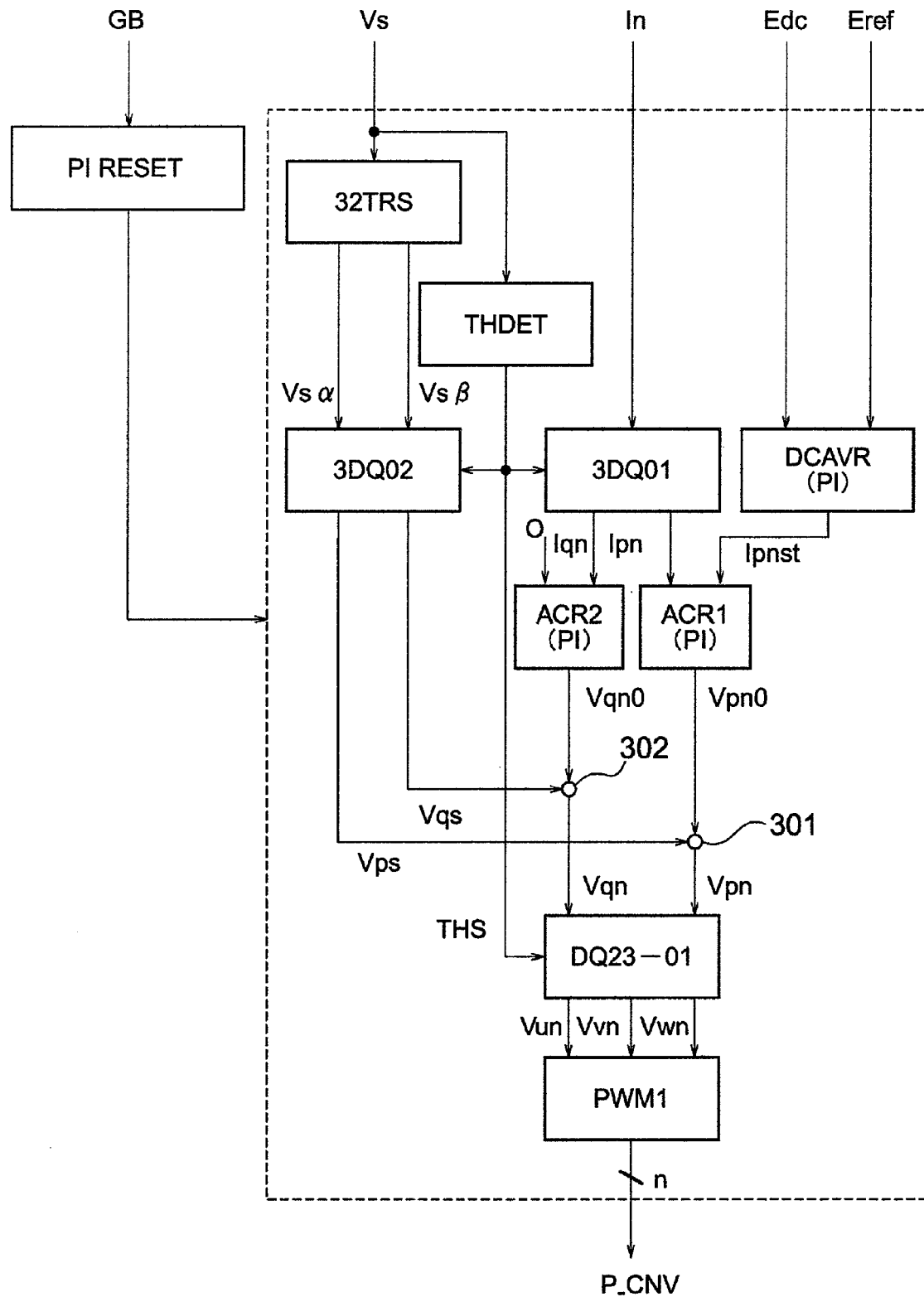
FIG. 6 is an explanatory view of a method of executing the control of the converter CNV.

Next, the function of the converter control device 205 is described below with reference to FIGS. 6 to 10. FIG. 6 shows the configuration of the control of the converter CNV. The converter CNV has the function of controlling the DC voltage Edc of a smoothing capacitor Cd at a constant level. Therefore, the converter CNV detects the phase of the system voltage detection value Vs, controls the current using the detected voltage phase, transmits and receives active power to and from the system, and controls the DC voltage.

When the converter INV for exciting a generator uses DC power, consumes the energy of the smoothing capacitor, and drops the DC voltage Edc, the converter CNV controls the DC voltage by charging the smoothing capacitor Cd using AC power to maintain a constant DC voltage Edc. On the other hand, when the converter INV charges the DC power and the DC voltage Edc rises, the converter CNV controls the DC voltage, converts the DC power into the AC power and discharges it, thereby maintain the DC voltage Edc at a constant level.

Before the converter CNV starts its operation, an input command Sg2 of the second electromagnetic contactor 209 is output, and the converter CNV is connected to the system.

The system voltage detection value Vs is input to the phase detector THDET and the three-to-two phase transformer 32TRS. The phase detector THDET calculates a phase signal THS following the voltage of the system in, for example, the phase locked loop (PLL) system, and outputs the phase signal THS (phase signal when the system U-phase voltage is used for a sine wave) to the three-to-two phase rotating coordinate converters 3DQ01 and 3DQ02, and the two-to-three phase coordinate converter DQ23-01. The direct current voltage command value Eref and the DC voltage detection value Edc are input to the DC voltage regulator DCAVR (configured by, for example, a proportional integration controller PI). The DC voltage regulator DCAVR regulates the output p-axis current command value (active current command value) Ipnstr so that the deviation between the input command value Eref and the detection value Edc is zero, and outputs the value to the current regulator ACR1.

The three-phase DQ coordinate converter 3DQ01 calculates the p-axis current detection value Ipn (active current) and the q-axis current detection value Iqn (reactive current) from the input current In by the three-to-two phase conversion equation in the equation 1 and the rotating coordinate conversion equation in the equation 2, and outputs the p-axis current detection value Ipn to the current regulator ACR1, and the q-axis current detection value Iqn to the current regulator ACR2.

The subscripts u, v, and w indicate the respective phases of the three-phase alternating current. For example, the U-phase current of In is expressed by Inu. Hereinafter, the voltage etc. is similar (U-phase of the system voltage detection value Vs is expressed by Vsu etc.).

$$\begin{pmatrix} In\alpha \\ In\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Inu \\ Inv \\ Inw \end{pmatrix} \quad (1)$$

$$\begin{pmatrix} Ipn \\ Iqn \end{pmatrix} = \begin{pmatrix} \sin(THS) & -\cos(THS) \\ \cos(THS) & \sin(THS) \end{pmatrix} \begin{pmatrix} In\alpha \\ In\beta \end{pmatrix} \quad (2)$$

The current regulator ACR1 regulates the p-axis voltage command value Vpn0 of the output so that the deviation between the p-axis current command value Ipnstr and the p-axis current detection value Ipn can be zero, and output the result to an adder 301. Similarly, the current regulator ACR2 regulates the output q-axis voltage command value Vqn0 so that the deviation between the q-axis current command value (=0) and the q-axis current detection value Iqn can be zero, and output the result to an adder 302. The current regulator (ACR1 and ACR2) can be configured by, for example, a proportional integration (PI) controller.

The three-to-two phase transformer 32TRS calculates an α component Vsα and a β component Vsβ from the input system voltage detection value Vs by the conversion equation in the equation 3, calculates the p-axis voltage detection value (phase component corresponding to the system voltage vector) Vps and the q-axis voltage detection value (component orthogonal to the p-axis voltage detection value Vps) Vqs, and outputs the values to the adders 301 and 302 respectively.

$$\begin{pmatrix} Vs\alpha \\ Vs\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Vsu \\ Vsv \\ Vsw \end{pmatrix} \quad (3)$$

$$\begin{pmatrix} Vps \\ Vqs \end{pmatrix} = \begin{pmatrix} \sin(THS) & -\cos(THS) \\ \cos(THS) & \sin(THS) \end{pmatrix} \begin{pmatrix} Vs\alpha \\ Vs\beta \end{pmatrix} \quad (4)$$

The adder 301 adds the p-axis voltage command value Vpn0 and the p-axis voltage detection value Vps, and outputs the result to the two-to-three phase coordinate converter DQ23-01. Similarly, the adder 302 adds the q-axis voltage command value Vqn0 and the q-axis voltage detection value Vqs, and outputs the result to the two-to-three phase coordinate converter DQ23-01.

The two-to-three phase coordinate converter DQ23-01 inputs the phase signal THS and the results Vpn and Vqn of the respective adders, calculates the voltage command values Vun, Vvn, and Vwn output by the converter DQ23-01 by the conversion equation in the equations 5 and 6, and outputs the results to the pulse calculation unit PWM1.

$$\begin{pmatrix} Va \\ Vb \end{pmatrix} = \begin{pmatrix} \sin(THS) & \cos(THS) \\ -\cos(THS) & \sin(THS) \end{pmatrix} \begin{pmatrix} Vpn \\ Vqn \end{pmatrix} \quad (5)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (6)$$

The pulse calculation unit PWM1 calculates the gate signal P_CNV for turning on/off n semiconductor elements configuring the power converter CNV from the input voltage commands Vun, Vvn, and Vwn by the pulse width modulation system, and outputs the results to the power converter CNV.

Furthermore, the operation state is determined from the gate block signal GB, a PI reset signal (proportional integration regulator) is generated, the PI reset signal is output when GB=0, and the PI reset signal is not output when GB=1. Thus, in the state of GB=0 in which the converter stops, the integrator in the controller can be reset, thereby preventing the previous values from being stored in the integrator, or preventing the saturation of the integrator when the operation is resumed, thereby correctly resuming the operation.

Figure 7:
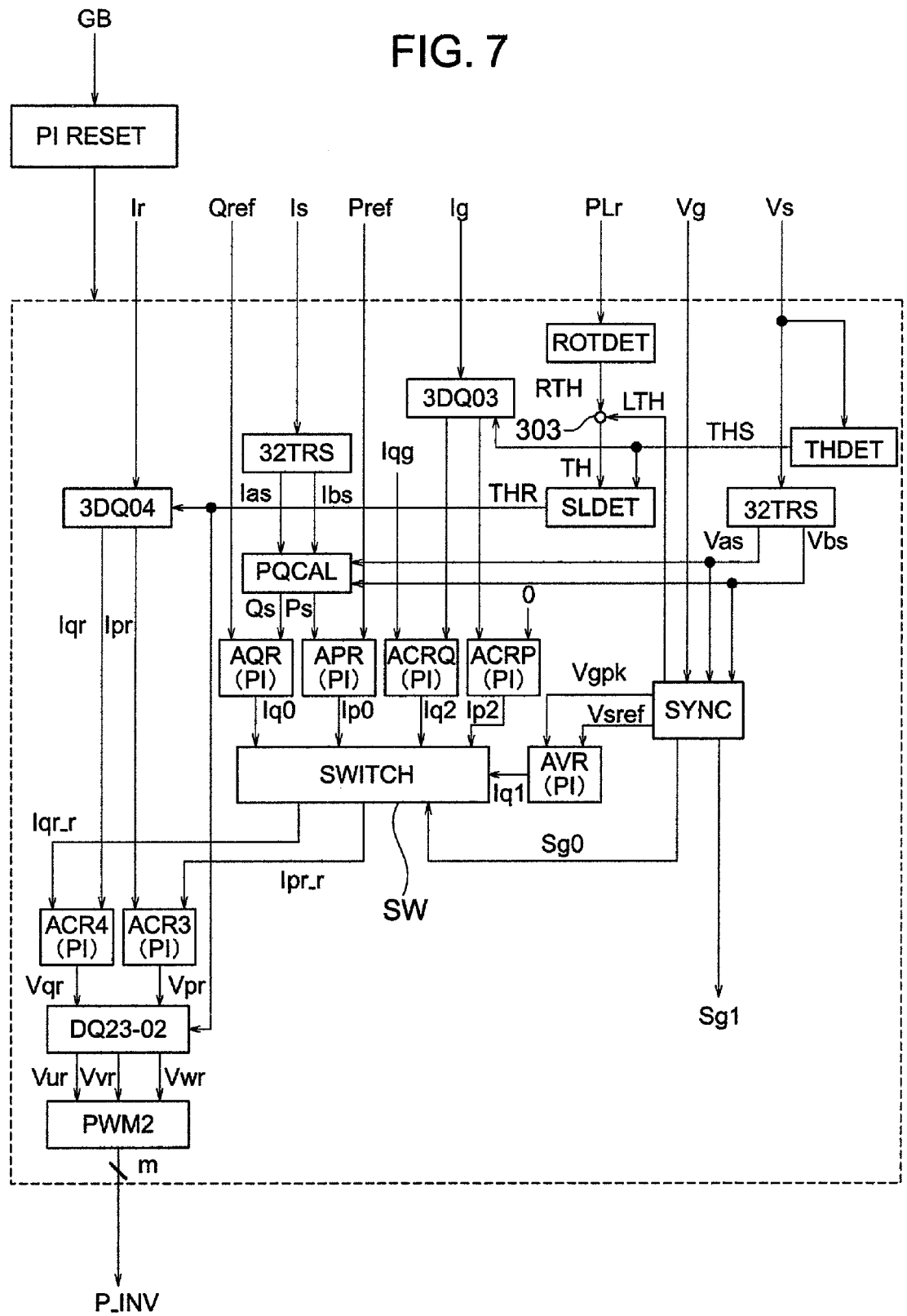
FIG. 7 is an explanatory view of a method of executing the control of the converter INV.

Next, the control of the converter INV is determined with reference to FIG. 7.

The phase signal PLr indicating the number of rotation and position of a generator is input to the rotational phase detector ROTDET. The rotational phase detector ROTDET counts the pulse PLr of a phase signal, converts it into the phase signal, resets the phase signal to 0 with one pulse per rotation (for example, the Z-phase pulse in an ABZ system encoder), and outputs the phase signal RTH from 0° to 360° without overflowing to an adder 303.

The phase signal RTH and the output phase signal LTH of the synchronous controller SYNC are added by the adder 303 into a phase signal TH. The phase signal TH is input to the excitation phase calculating unit SLDET together with the phase signal THS (described above with reference to the converter CNV).

The excitation phase calculating unit SLDET obtains a difference between the phase signals TH and THS, and multiplies the difference by a polar logarithm of k of the generator (THR=k (THS−TH)), and outputs the phase signal THR of the electric angular frequency of the protocol of the generator.

The power calculator PQCAL converts the system current Is by the same transform matrix as the equation 1, inputs the obtained α-axis current Isα, β-axis current Isβ, and the α-axis voltage detection value Vsα and β-axis voltage detection value Vsβ calculated by the equation 3, and calculates the active power Ps and reactive power Qs of the system by the equation 7.

$$Ps=3(Vs\alpha \times Is\alpha + Vs\beta \times Is\beta)/2$$

$$Qs=3(-Vs\alpha \times Is\beta + Vs\beta \times Is\alpha)/2 \quad (7)$$

The active power regulator APR inputs the active power Ps and the active power command value Pref of the wind power generation device, and outputs the active current command value Ip0 of the output so that the deviation between the active power command value Pref and the power detection value Ps can be zero. In this example, an active power command is exemplified. In the case of a torque command, a torque command is multiplied by the number of rotations of the generator for conversion into an active power command for control. Unlike the torque control, the active power control is not subject to a change in the number of rotations, thereby realizing control at a constant level of output power.

The reactive power regulator AQR inputs the reactive power Qs and the reactive power command value Qref of the wind power generation device, and outputs the excitation current command value Iq0 of the output so that the difference between the reactive power command value Qref and the power detection value Qs can be zero. The active power regulators APR and AQR can be configured by, for example, a proportional integrator.

The current command value Ip0 and Iq0 of each output of the active/reactive power regulator are input to the switch SW.

The generator stator current Ig is input to the three-phase rotating coordinate converter 3DQ03. The three-phase rotating coordinate converter 3DQ03 is decomposed into the active current Ipg and the reactive current Iqg by the conversion equations in the equations 1 and 2, and input to the generator current regulators ACRP and ACRQ.

In addition, the generator current regulator ACRP inputs zero as a stator active current command value, calculates the rotor current command value Ip2 so that the active current component Ipg of the generator stator current can be zero, and outputs the result to the switch SW. Furthermore, the generator current regulator ACRQ inputs the stator reactive current command value Iqg, calculates the rotor current command value Iq2 so that the reactive current component Iqg can match the command value, and outputs the result to the switch SW.

Next, the voltage regulator AVR is described below. The voltage regulator AVR sets the amplitude value Vgpk of the generator stator voltage Vg as a feedback value, input the value Vsref obtained by passing the amplitude value of the system voltage detection value Vs through a filter FIL as a command value, and outputs the excitation current command value Iq1 that sets the deviation between the amplitude value of the generator Vg and the command value as zero to the switch SW. The voltage regulator AVR can be configured by, for example, a proportional integration controller. The voltage regulator AVR regulates the excitation current command value passing through the secondary side of the generator 201 from the converter INV to operate the electromagnetic contactor 208 in an open state and to match the amplitude value of the system voltage with the amplitude value of the stator voltage.

Figure 10:
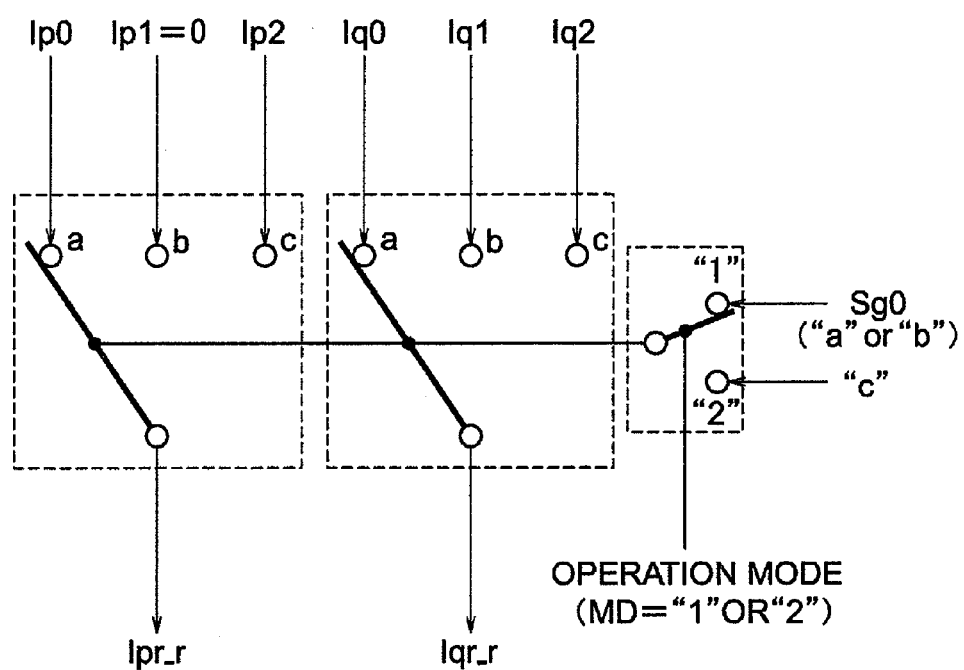
FIG. 10 is an explanatory view of a switch SW.

FIG. 10 shows the configuration of the switch SW. The SW determines which is to be output, the normal generating operation mode in which the output (Ip0 and Iq0) of the active power regulators APR and AQR is used, the system synchronous operation mode in which zero is used for an active current command value and the output Iq1 of the voltage regulator is used for an excitation current command value, of the system fault time operation mode in which the output (Ip2, Iq2) of the stator current regulators ACRP and ACRQ for regulating the stator current of a generator is used.

Before the 301 is powered up (that is, during the voltage synchronous operation in which the generator stator voltage is synchronous to the system voltage, the input signal Sg0="b"), the switch SW sets the active current command value to 0, and the excitation current command value to the output Iq1 of the voltage regulator, and after powering up the electromagnetic contactor 208 (input signal Sg0="a"), selects the output Ip0 and Iq0 of the power regulators APR and AQR. In addition, in the normal generating operation, the operation mode MD signal is in the state of "1", and the command value switch is selected by the input signal Sg0. However, in the operation mode MD "2" after detecting a system fault etc., Ip2 and Iq2 as the output of the stator current regulators ACRP and ACRQ of the stator are selected, and output from the switch SW.

The synchronous controller SYNC has the function of determining based on the generator stator voltage detection value Vgpk whether or not the voltage amplitude of a generator is synchronized when the electromagnetic contactor 208 is in the open state, the function of outputting the phase correction signal LTH for correction when the system voltage is different in phase from the stator voltage, and the function of determining whether or not the phases of the system voltage and the stator voltage have entered a predetermined range and are synchronized, and outputs an operation signal Sg1 of a breaker and a control switch signal Sg0. When the electromagnetic contactor 208 enters a closed state by the signal Sg1, the phase correction signal LTH holds the value at this time.

Using the function of the synchronous controller, the generator 201 can be synchronized with the system voltage before it is connected to the system. After it is connected to the system, control can be quickly switched to power control.

The three-phase rotating coordinate converter 3DQ04 calculates the q-axis current detection value Iqr (excitation current component) and the p-axis current detection value Ipr (active current component) by the conversion equation in the equations 8 and 9 from the input current Ir and the phase THR of the rotor, and outputs the q-axis current detection value Iqr to the current regulator ACR4 and the p-axis current detection value Ipr to the current regulator ACR3.

$$\begin{pmatrix} Ir\alpha \\ Ir\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Iru \\ Irv \\ Irw \end{pmatrix} \tag{8}$$

$$\begin{pmatrix} Ipr \\ Iqr \end{pmatrix} = \begin{pmatrix} \sin(THR) & -\cos(THR) \\ \cos(THR) & \sin(THR) \end{pmatrix} \begin{pmatrix} Ir\alpha \\ Ir\beta \end{pmatrix} \tag{9}$$

The current regulator ACR4 regulates the q-axis voltage command value Vqr of the output to set to 0 the deviation between the q-axis current detection value Iq1 or Iq0 or Iq2 and the q-axis current detection value Iqr. Similarly, the current regulator ACR3 regulates the p-axis voltage command value Vpr of the output to set to 0 the deviation between the p-axis current detection value Ip1 or Ip0 or Ip2 and the p-axis current detection value Ipr. The current regulator can be configured by, for example, a proportional integrator.

The p-axis voltage command value Vpr and the q-axis voltage command value Vqr are input to the two-to-three phase coordinate converter DQ23-02, and the two-to-three phase coordinate converter DQ23-02 calculates the voltage commands Vur, Vvr, and Vwr output from the converter DQ23-02 by the conversion equation in the equations 10 and 11 according to the phase signal THR and each of the input values, and outputs the result to the pulse calculation unit PWM2.

$$\begin{pmatrix} Va \\ Vb \end{pmatrix} = \begin{pmatrix} \sin(THR) & \cos(THR) \\ -\cos(THR) & \sin(THR) \end{pmatrix} \begin{pmatrix} Vpr \\ Vqr \end{pmatrix} \tag{10}$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \tag{11}$$

The pulse calculation unit PWM2 calculates the gate signal P_INV for turning on/off m semiconductor elements configuring the converter INV by the pulse width modulation system from the input voltage commands Vur, Vvr, and Vwr.

Figure 8:
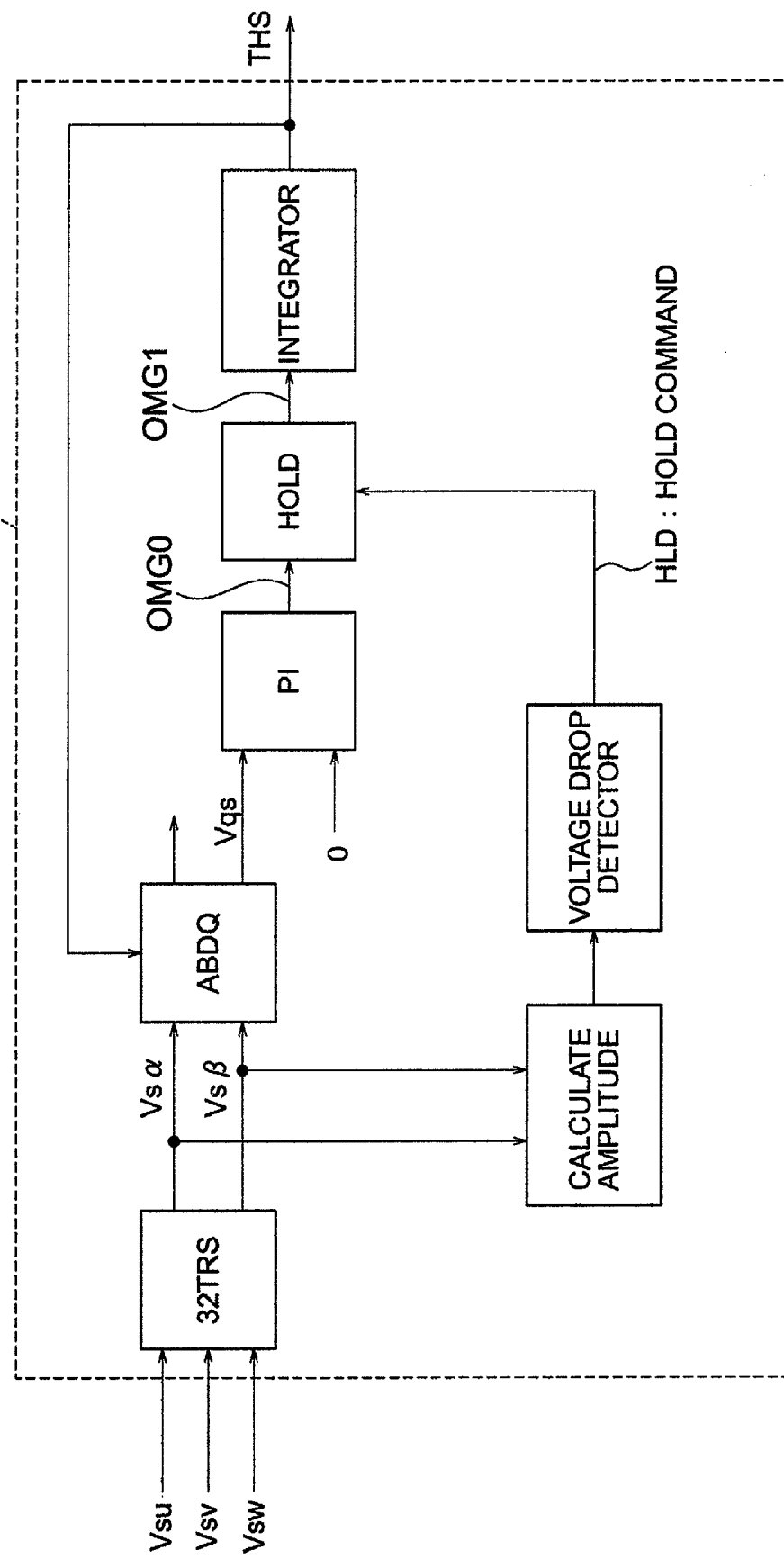
FIG. 8 is an explanatory view of a phase detector THDET.

Next, the phase detector THDET is determined with reference to FIG. 8. The phase detector THDET inputs the system voltage detection value Vs, performs a calculation by the equation 3 by the three-to-two phase transformer 32TRS, and converts the results into two-phase voltage signals Vsα and Vsβ. The rotating coordinate converter ABDQ inputs the two-phase signals Vsα and Vsβ, and calculates Vps and Vqs by the coordinates conversion equation in the equation 4. If the calculated phase THS matches the U-phase of the system voltage, Vqs is zero, based on which the phase is corrected so that Vqs can be zero. Therefore, Vqs is compared with zero, thereby generating frequency correct command OMG0. When the hold command HLD input to the hold unit HOLD from the voltage drop detector indicates holding, the frequency correct command OMG0 input to the hold unit HOLD is ignored, and the value of the previous frequency is output. When the hold signal does not indicate holding, the input frequency correct command OMG0 is output from the hold unit. The output signal OMG1 of the hold unit HOLD is input to the integrator, and is integrated by the integrator, thereby converting the frequency signal OMG1 into the phase signal THS by the integration by the integrator.

The phase detector THDET determines the voltage amplitude and holds a frequency signal. The voltage amplitude is calculated from the root of a square sum of the two-phase voltage signals. When the voltage amplitude is 10% or less than in the normal operation, the voltage detection accuracy is reduced. Therefore, the voltage drop detector transmits a hold command HLD for holding the frequency in the hold unit HOLD to hold the frequency signal. When the voltage of the terminal on the power system side of a transformer indicates zero due to a power system fault, the voltage observed on the generator side (power system side) of the transformer is about 10% of the normal value when the leak by the transformer is 10% and the system current is 10%. Thus, when the voltage observed on the generator side of the transformer is 10%, it is estimated that the system has been disconnected, and the power system voltage of 10% or less of the normal value holds a frequency.

Since the voltage calculated as a product of the system current Is and the leakage impedance of the transformer 207 is independently operated regardless of the power supply of the power system, the hold unit HOLD is operated to output a hold signal of the internal frequency signal OMG1.

When the system voltage drops and a recovery is required in a short time, the voltage phase when the recovery is performed is not largely deviated from the phase estimated using the frequency before the fault, the phase shift when the system voltage is recovered can be reduced by setting the phase estimated by the frequency before the fault and the lapse of time from the fault. By the frequency holding function, the phase detector can estimate the phase when the voltage drops, thereby reducing the phase shift at the recovery from the fault.

Figure 9:
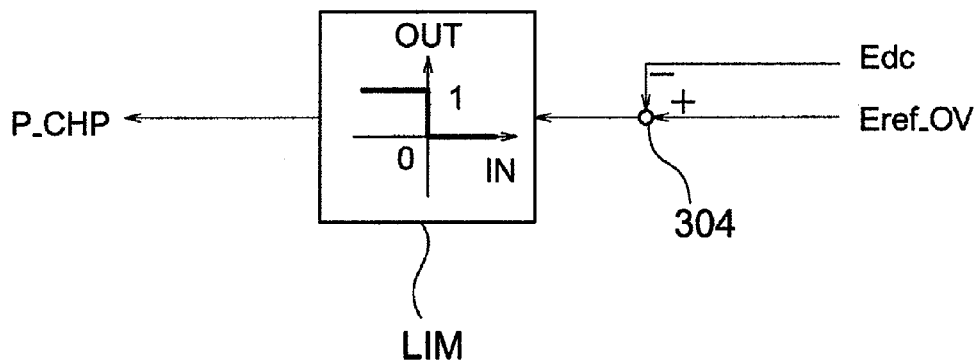
FIG. 9 is an explanatory view of a method of executing the control of the rectifier 212.

Next, the operation of the rectifier 212 is described below with reference to FIG. 9. When a system disturbance occurs, for example, when a system voltage drops, the current increases by $\Delta I$ by the voltage difference $\Delta V$ between the inductance voltage and the system voltage. At this time, when the rate of the number of winding of the doubly-fed generator is a, the current of $\Delta I/a$ increases in the secondary coil. When the current of $\Delta I/a$ is high, an overcurrent passes through the secondary coil. At this time, the overcurrent is detected and the gate block signal GB becomes 0 (GB=0). Thus, the converters CNV and INV stops the switching operation of the semiconductor element. Since the converter INV and the rectifier 212 are connected through the reactors Lr and Lx on the secondary side of the generator, the current Ir passing through the Lr is separated from the Ix passing through the Lx at the rate of the reactors.

$$Ir=(\Delta I/a) \times Lx/(Lr+Lx) \quad (12)$$

The separated currents charges the capacitors Cd and Cx of the direct current, and raise the voltage of the direct current. When the voltage of the direct current rises, the rectifier DOD and the elements and capacitors configuring the converters INV and CNV fall in insulation destruction. Therefore, when the voltage of the direct current exceeds a predetermined value (for example, 110% of the normal value), the energy consuming device CHP is operated. As a result, as shown in FIG. 9, the DC voltage Edc is compared with the overvoltage level Eref_OV, and when the DC voltage Edc is higher, a command P_CHP to turn on ("1") the IGBT element of the energy consuming device CHP is output.

Figure 11:
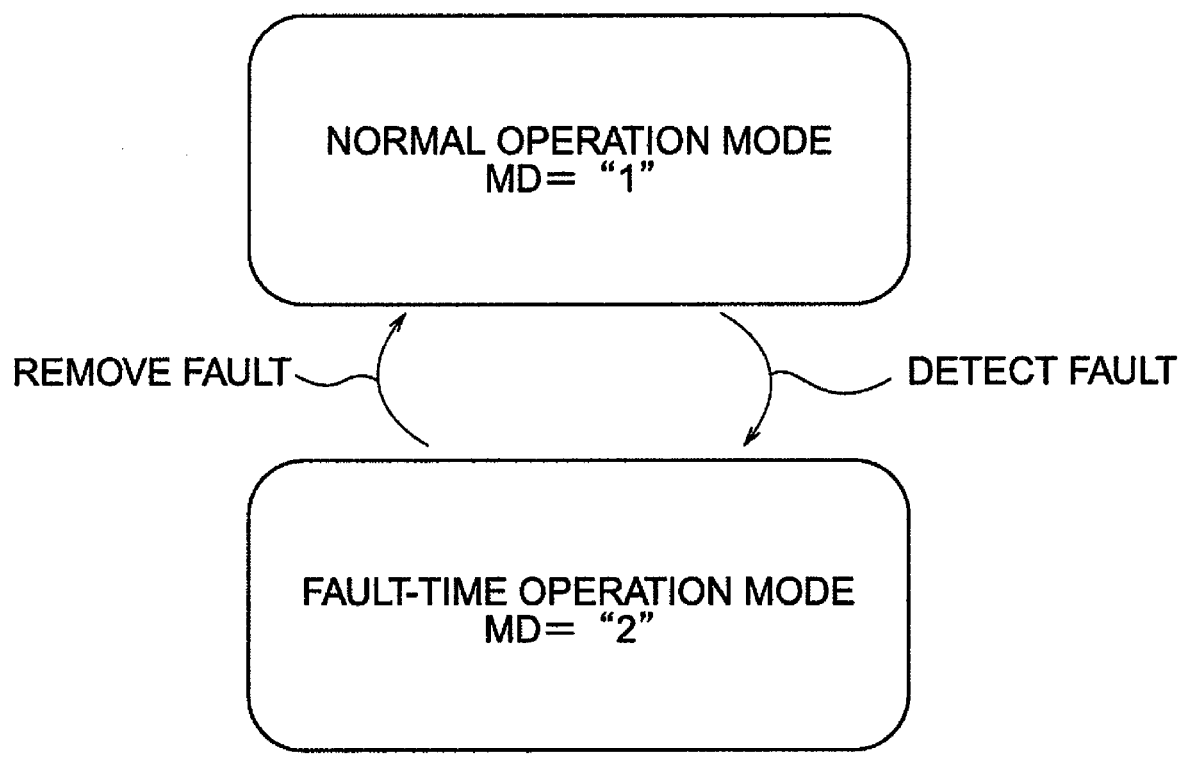
FIG. 11 is an explanatory view of the state transition of the operation mode.

Next, the operation mode shown in FIG. 10 is described with reference to FIGS. 11 to 14. FIG. 11 shows a state transition. As shown in FIG. 11, in the normal generating operation mode, the operation mode MD is "1", and when a power system fault etc. such as a voltage drop is detected, the operation mode MD is "2".

Figure 13:
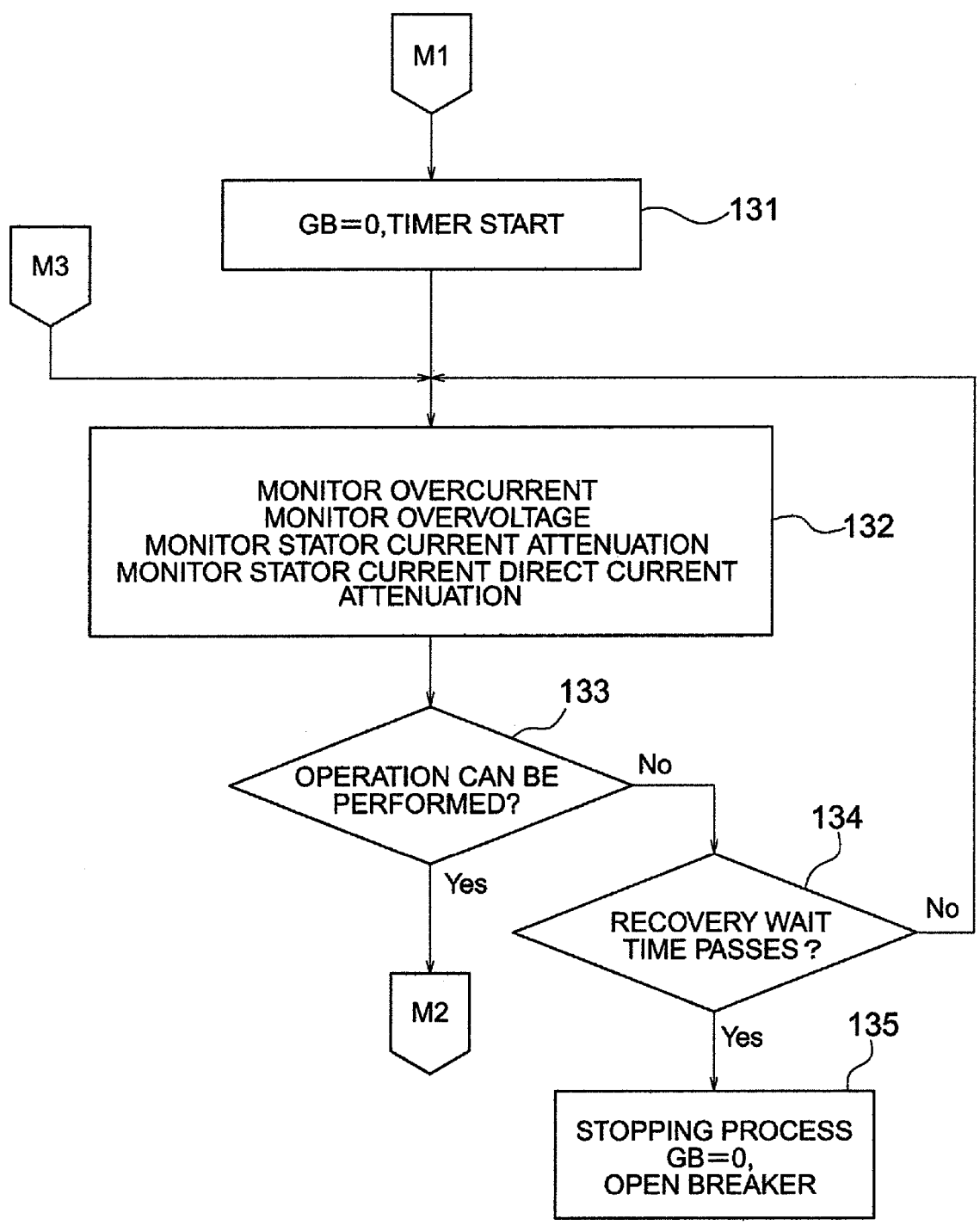
FIG. 13 is an explanatory view of a standby operation for driving when an abnormal condition is detected.
Figure 14:
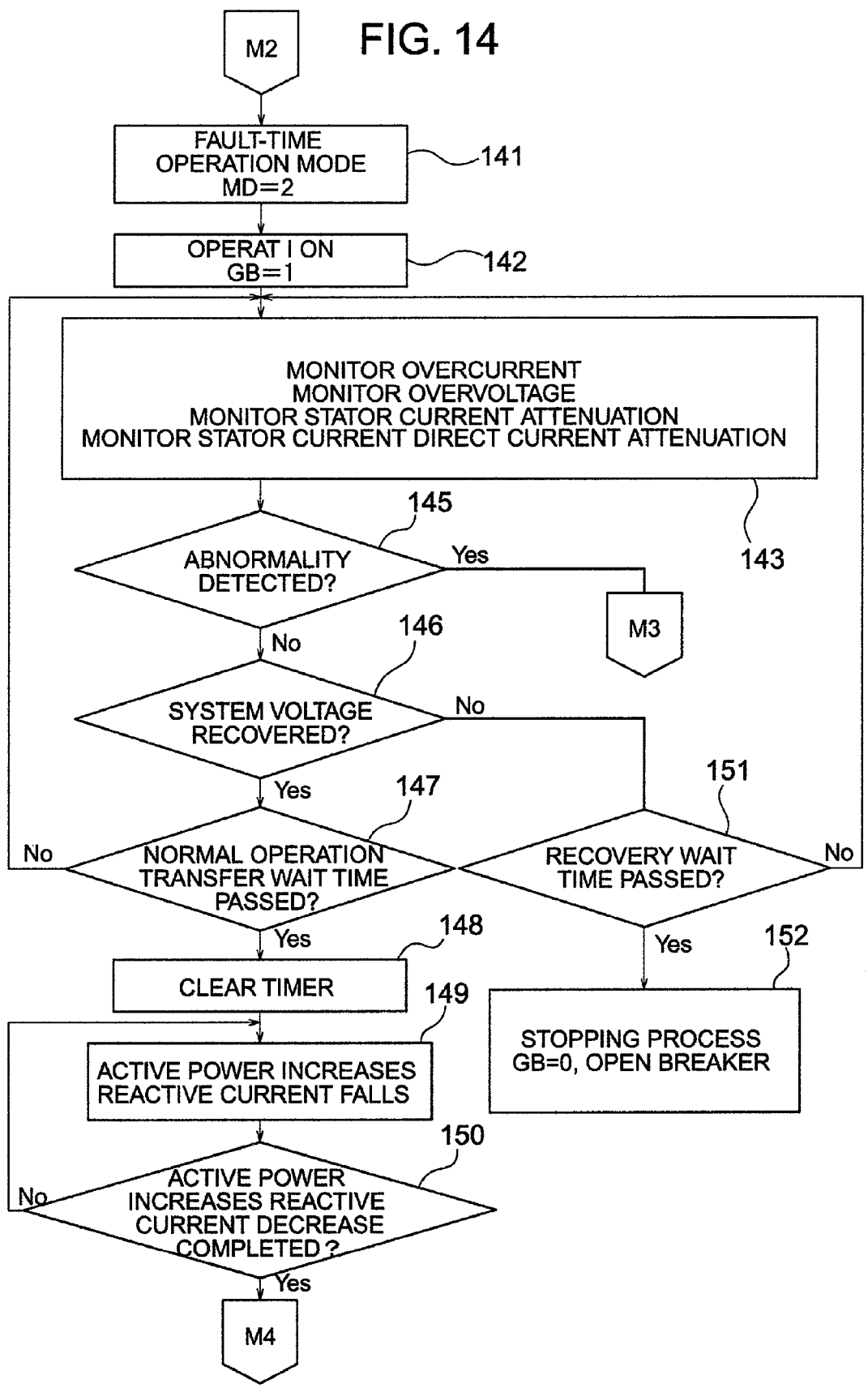
FIG. 14 is an explanatory view of a driving operation when a system is in an abnormal condition.

Next, the operation of the operation state at a fault is described below with reference to the flowcharts shown in FIGS. 13 to 14. In the figures, M1 to M4 show the connection points to other flowcharts.

Figure 12:
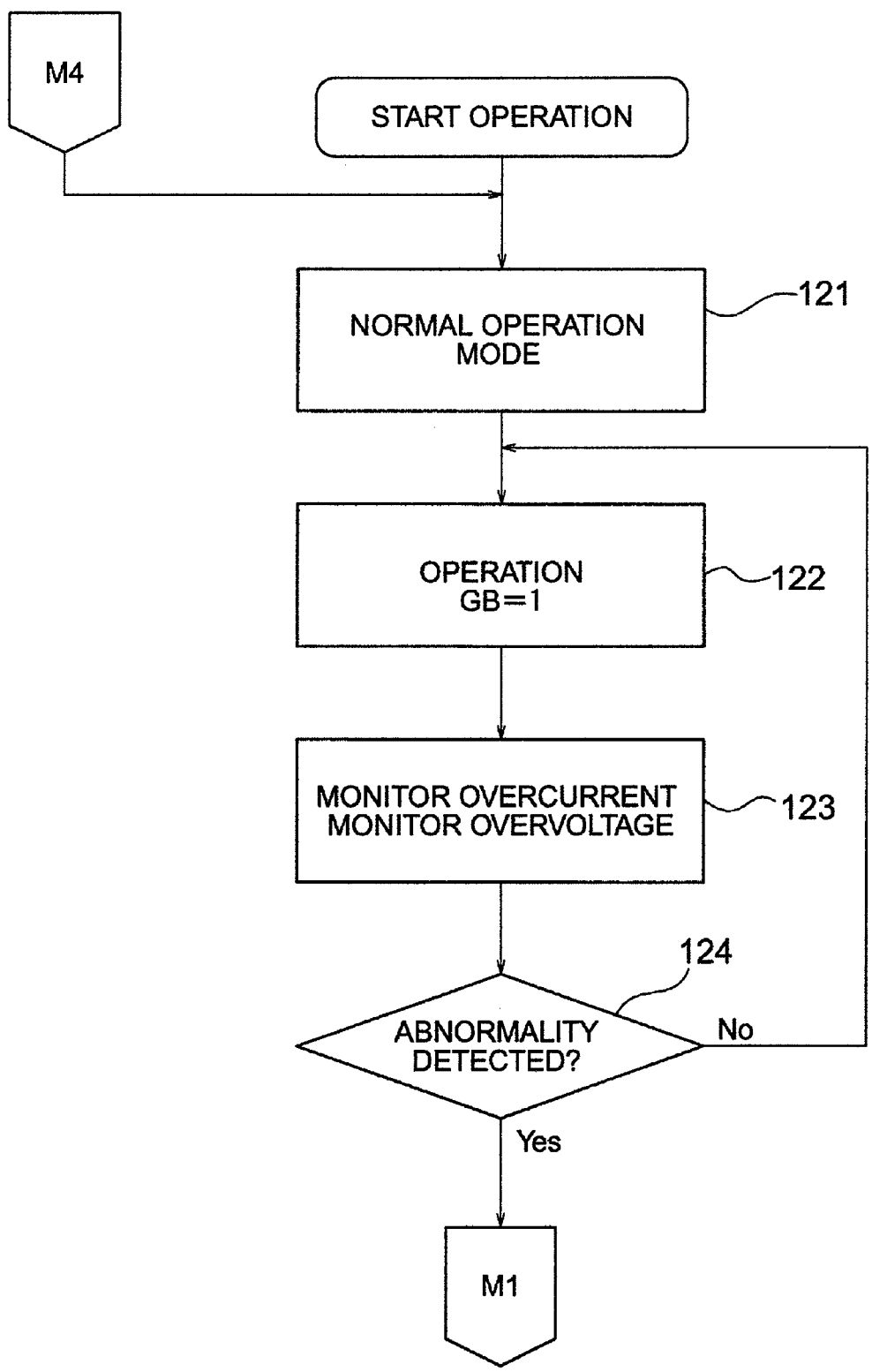
FIG. 12 is an explanatory view of a driving operation in a normal operation.

FIG. 12 is a flowchart of a normal operation. First, when an operation start command is input, an operation is started in a normal operation mode MD=1 (step 121). At this time, the gate block signal GB is set to 1 (GB=1) to enter a gate block release state (step 122). During the operation, the overcurrent of the generator stator current Ig, the overcurrent of the rotor current Ir, and the overvoltage of the DC voltage Edc of the converter INV are constantly monitored (step 123). When an abnormal condition is detected, control is passed to an abnormal mode (step 124).

Next, the transition to the abnormal mode is described with reference to FIG. 13. When a system abnormal condition is detected, the gate block signal GB is first set to GB=0 (step 131). Thus, as described above, the proportional integration regulator of the control is reset, the gate signals P_INV and P_CNV are ignored, and the semiconductor switching elements configuring the converters INV and CNV are all in the OFF state. The timer operation is started. Next, the overcurrent of the generator stator current Ig, the overcurrent of the rotor current Ir, and the overvoltage of the DC voltage Edc of the converter INV, and the direct current of the generator stator current Ig are monitored (step 132). When there are no abnormal conditions detected, and the operation can be resumed, control is passed to the next operation mode (FIG. 14) (step 133). In this example, an example of monitoring the direct current component of a generator current is monitored. It is also possible to make a determination by the attenuation time constant T0 depending on the circuit constant (resistor, inductance) of a generator. In this case, the time monitor by a timer can replace the abnormal condition removing monitor of the overcurrent of a generator using the timer value exceeding T0.

When an abnormal condition continues and is not removed after a recovery wait time based on the timer value (step 134), control is passed to a stopping process, GB=0 is set, and the breakers 208 and 206 are released (step 135). If the timer value does not reach the recovery wait time, the monitor of an abnormal condition and the determination of possible operation are repeated.

Next, the operation mode (MD="2") after removing the fault is described below with reference to FIG. 14. When an overcurrent and an overvoltage due to a fault are removed and the operation can be resumed, the fault-time operation mode MD=2 is set (step 141) and the operation is started. Then, the gate signal GB=1 is set (step 142). By setting the operation mode MD=2, control is switched to the control of the generator stator current as described above with reference to FIG. 10. After the operation is started in the fault-time operation mode, the overcurrent of the generator stator current Ig, the overcurrent of the rotor current Ir, the attenuation of the direct current of the generator stator, and the overvoltage of the voltage of the direct current of the converter INV are monitored (step 143). When an abnormal condition is detected (YES in step 145), control is passed to the abnormal time standby mode as shown in FIG. 13. It can be considered that the system voltage drops plural times due to a system fault. In this case, the standby mode shown in FIG. 13 is temporarily entered. When the system voltage is recovered (YES in step 146) in the abnormal time operation mode, and when the normal operation transfer wait time is passed (YES in step 147), the timer is cleared (step 148), the active power and the reactive current (or reactive power) are returned to the values before the fault, and control is returned to the normal operation mode. The normal operation transfer wait time and the power recovery rate depend on the request from a system operator etc.

When control is returned to the normal operation mode, the active power is moderately increased and the reactive current (or reactive power) is moderately decreased to the value before the fault. Thus, by moderately returning the active power and the reactive current (or reactive power) to the values before the fault, an overcurrent and an overvoltage occurring by a fluctuation of active power and reactive current (or reactive power) can be prevented.

If the system voltage is not recovered in the abnormal time operation mode (NO in 146), and when the system voltage is not recovered after the recovery wait time (YES in step 151), then control is passed to the stopping process (step 152). If the recovery wait time has not passed (NO in step 151), then the abnormal time operation mode is continued.

By a generator supplying a reactive current during a system voltage drop, the voltage of a generation system cooperation point rises. At this time, the converter CNV starts its operation. Although the system voltage is completely reduced to zero, the voltage at the cooperation point (secondary side of the transformer) rises by the impedance of the transformer. At this time, since the converter CNV operates, the DC voltage Edc can be constantly controlled by the power of the generator.

With the above-mentioned configuration, the wind power generation system can perform the following operation.

By detecting and reactivating the attenuation of a stator current and the direct current component of the stator current, the output control of the reactive current during a fault can be correctly started.

By operating the converter CNV even during the system fault, the converter CNV can be operated using the voltage of the generator, the charging current for the DC voltage Edc can be obtained from the generator, and the operation can be continued with the direct current maintained even during power failure for a long time.

By switching to stator current control during a system fault, the stator current can be controlled at a predetermined value.

If an overcurrent occurring when a system voltage is suddenly recovered exceeds a protection level of a converter, a gate is stopped and reactivated, thereby realizing correct supply of a correct reactive current when recovery from a fault is performed When a system voltage drops, especially around a voltage of zero, the phase detection of control is locked to follow the phase signal calculated from the phase and the frequency before the system voltage drop, thereby reducing the frequency fluctuation when the system voltage drops to zero, and preventing an overcurrent when the system voltage is recovered.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation system in which a stator of a doubly-fed generator is connected to an electric power system, a rotor of the doubly-fed generator is connected to a power converter for alternating current excitation, the rotor is mechanically connected to a wind turbine, a direct current side of a power system side power converter connected to the stator and the electric power system is connected to a direct current side of the power converter for alternating current excitation, and the power converter for alternating current excitation excites the doubly-fed generator to allow the doubly-fed generator to supply generated power to the electric power system, said wind power generation system comprising:

a control device for controlling the power converter for alternating current excitation and the system side power converter;

a system fault detector for detecting a voltage drop of the electric power system, an overcurrent of a direct current component of the stator current, or an overcurrent of an alternating current of the stator current;

a stator current detector for detecting a current passing through the stator; and converter operation means for allowing the power converter for alternating current excitation to start excitation of the doubly-fed generator after the system fault detector detects a system fault and the current of the stator is lower than a predetermined value.

2. The wind power generation system according to claim 1, wherein the converter operation means comprises operation means for allowing the power converter for alternating current excitation to start excitation of the doubly-fed generator after the system fault detector detects a system fault and a direct current component of the stator current is lower than a predetermined value.

3. The wind power generation system according to claim 1, wherein the converter operation means comprises: time count means for counting elapsed time from when the system fault detector detects a system fault; and operation means for starting excitation of the doubly-fed generator when a time longer than a predetermined attenuation time constant determined by a circuit constant of a generator passes.

4. The wind power generation system according to claim 1, further comprising a voltage detector for detecting a voltage of the electric power system, wherein the control device comprises: phase calculation means for calculating a voltage phase signal following a voltage phase of an electric power system; and fault time phase calculation means for calculating a voltage phase signal from a voltage phase and a frequency of an electric power system before detecting a system fault when the system fault detector detects a system fault.

5. The wind power generation system according to claim 1, further comprising a voltage detector for detecting a voltage of the electric power system, wherein the control device comprises: phase calculation means for calculating a voltage phase signal following a voltage phase of an electric power system; and fault time phase calculation means for calculating a voltage phase signal from a voltage phase and a frequency of an electric power system before detecting a voltage drop of the electric power system when the voltage of the electric power system drops to 10% or less of a normal value.

6. The wind power generation system according to claim 1, further comprising:

system abnormality detection means for detecting an overcurrent of a generator, an overcurrent of the power converter, or an overvoltage of a PC voltage of the power converter when a drop of a system voltage is removed and the system voltage rises; and converter stop means for gate blocking the power converter for alternating current excitation when the system abnormality detection means detects the system abnormality.

7. The wind power generation system according to claim 6, further comprising operation means for resuming an operation of the power converter for alternating current excitation after the system abnormality is removed.

8. The wind power generation system according to claim 7, further comprising:
   means for moderately increasing active power for output to an electric power system after resuming an operation of the power converter for alternating current excitation; and means for simultaneously and moderately decreasing a reactive power or a reactive current.

9. The wind power generation system according to claim 1, wherein
   the power converter for alternating current excitation comprises means for regulating a current of the rotor for controlling a current of the stator at a predetermined value during a system fault.

10. A method of controlling a power converter, connected to a stator of a doubly-fed generator having a rotor mechanically connected to a wind turbine and a stator connected to an electric power system, for regulating power to be supplied to an electric power system by controlling a system side power converter for converting AC power of a stator into DC power, and an exciting power converter, connected to a direct current of the system side power converter and connected to the rotor after converting a DC power of the direct current into AC power to excite the doubly-fed generator by the AC power, wherein
   after a voltage drop of the electric power system, an overcurrent of a direct current of the stator current, or an overcurrent of an alternating current of the stator current occurs, and the current of the stator falls below a predetermined value, the exciting power converter starts excitation of the doubly-fed generator.

11. The method of controlling a power converter according to claim 10, wherein
   after a voltage drop of the electric power system, an overcurrent of a direct current of the stator current, or an overcurrent of an alternating current of the stator current occurs, and when the stator current of the current of the stator falls below a predetermined value, the exciting power converter starts excitation of the doubly-fed generator.

12. The method of controlling a power converter according to claim 10, wherein after a voltage drop of the electric power system, an overcurrent of a direct current of the stator current, or an overcurrent of an alternating current of the stator current occurs, and when a time longer than a predetermined attenuation time constant depending on a circuit constant of a generator passes, the exciting power converter starts excitation of the doubly-fed generator.

13. The method of controlling a power converter according to claim 10, wherein
   a voltage phase signal is calculated from a voltage phase and a frequency of an electric power system when a voltage drop of the electric power system, an overcurrent of a direct current of the stator current, or an overcurrent of an alternating current of the stator current occurs, or before a voltage drop of the electric power system, an overcurrent of a direct current of the stator current, or an overcurrent of an alternating current of the stator current occurs.

14. The method of controlling a power converter according to claim 10, wherein
   a voltage phase signal is calculated from a voltage phase and a frequency of an electric power system before a voltage drop of the electric power system when a voltage of the electric power system falls below 10% or less of a normal value.

15. The method of controlling a power converter according to claim 10, wherein
   the exciting power converter is gate blocked after a system voltage stops decreasing and changes into increase, and when an overcurrent of a generator, an overcurrent of the power converter or an overvoltage of a DC voltage of the power converter occurs.

16. The method of controlling a power converter according to claim 15, wherein
   an operation of the exciting power converter is resumed after an overcurrent of the generator, an overcurrent of the power converter or an overvoltage of a DC voltage of the power converter occurs.

17. A method of controlling a power converter according to claim 16, wherein
   after resuming an operation of the power converter for alternating current excitation, active power output to an electric power system is moderately increased, and reactive power or a reactive current is moderately decreased.

18. A method of controlling a power converter according to claim 10, wherein
   when a voltage drop of the electric power system, an overcurrent of a direct current of the stator current, or an overcurrent of an alternating current of the stator current occurs,
   a current of the rotor is regulated by the exciting power converter to control the stator current at a predetermined value.

* * * * *